(12) United States Patent
Kemerer et al.

(10) Patent No.: US 7,076,749 B2
(45) Date of Patent: Jul. 11, 2006

(54) METHOD AND SYSTEM FOR IMPROVING INTEGRATED CIRCUIT MANUFACTURING PRODUCTIVITY

(75) Inventors: Douglas W. Kemerer, Essex Junction, VT (US); Daniel N. Maynard, Craftsbury Common, VT (US); Gustavo E. Tellez, Essex Junction, VT (US); Lijiang L. Wang, South Burlington, VT (US); Peter S. Wissell, Cambridge, VT (US)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 10/709,807

(22) Filed: May 28, 2004

(65) Prior Publication Data

US 2005/0278663 A1 Dec. 15, 2005

(51) Int. Cl.
*G06F 17/50* (2006.01)

(52) U.S. Cl. ............................................. 716/4; 716/5
(58) Field of Classification Search .................... 716/4, 716/5
See application file for complete search history.

(56) References Cited

U.S. PATENT DOCUMENTS 5,539,652 A * 7/1996 Tegethoff ...................... 703/14
6,397,373 B1 * 5/2002 Tseng et al. ................... 716/5

OTHER PUBLICATIONS

Holden et al., "Predicting Assembly Costs Before Design with the Design Report Card", Emerging Technologies Conference, Nov. 16, 1998.*
Gold et al., "A Quantitative Approach to Nonlinear Process Design Rule Scaling", 18th Conference on Advanced Research in VLSI (ARVLSI '99), Mar. 21-24, 1999, Atlanta, GA, USA, IEEE Computer Society 1999.*

* cited by examiner

Primary Examiner—Jack Chiang
Assistant Examiner—Brandon Bowers
(74) Attorney, Agent, or Firm—Schmeiser, Olsen & Watts; Richard M. Kotulak (57) ABSTRACT

A method and a system for improving manufacturing productivity of an integrated circuit. The method including: (a) generating a set of physical design rules, (b) assigning a rule scoring equation to each physical design rule of the set of physical design rules; (c) checking a physical design of the integrated circuit for deviations from each design rule; (d) computing a score for each physical design rule, using the corresponding rule scoring equation assigned to each physical design rule, for which one or more deviations were found in step (c); and (e) computing a productivity score for the integrated circuit design based on the scores computed in step (d).

20 Claims, 5 Drawing Sheets

METHOD AND SYSTEM FOR IMPROVING INTEGRATED CIRCUIT MANUFACTURING PRODUCTIVITY

BACKGROUND OF INVENTION

1. Field of the Invention

The present invention relates to the field of integrated circuit design; more specifically, it relates to method and system for improving integrated circuit manufacturing productivity during the design of the integrated circuit.

2. Background of the Invention

As groundrules for integrated circuit design decrease, two sets of groundrules for any given groundrule generation have emerged. The first set of groundrules is the traditional minimum groundrules, i.e. minimum linewidth and space. The second set of groundrules is the recommended groundrules. The first set is directed to functionality, the second set to manufacturing yield. Actually checking a design to these two sets of rules is problematic. Therefore, there is a need in the semiconductor industry for a method of improving integrated circuit manufacturing productivity utilizing efficient rule checking.

SUMMARY OF INVENTION

A first aspect of the present invention is a method of improving manufacturing productivity of an integrated circuit, comprising: (a) generating a set of physical design rules, (b) assigning a rule scoring equation to each physical design rule of the set of physical design rules; (c) checking a physical design of the integrated circuit for deviations from each design rule; (d) computing a score for each physical design rule, using the corresponding rule scoring equation assigned to each physical design rule, for which one or more deviations were found in step (c); and (e) computing a productivity score for the integrated circuit design based on the scores computed in step (d).

A second aspect of the present invention is A computer system comprising a processor, an address/data bus coupled to the processor, and a computer-readable memory unit coupled to the processor, the memory unit containing instructions that when executed by the processor implement a method for improving manufacturing productivity of an integrated circuit, the method comprising the computer implemented steps of: (a) generating a set of physical design rules, (b) assigning a rule scoring equation to each physical design rule of the set of physical design rules; (c) checking a physical design of the integrated circuit for deviations from each design rule; (d) computing a score for each physical design rule, using the corresponding rule scoring equation assigned to each physical design rule, for which one or more deviations were found in step (c); and (e) computing a productivity score for the integrated circuit design based scores computed in step (d).

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION

The term integrated circuit is intended to include the range from an entire integrated circuit chip through individual integrated circuit functions, such as microprocessors and embedded memory to individual analog and logic circuits.

Figure 1:
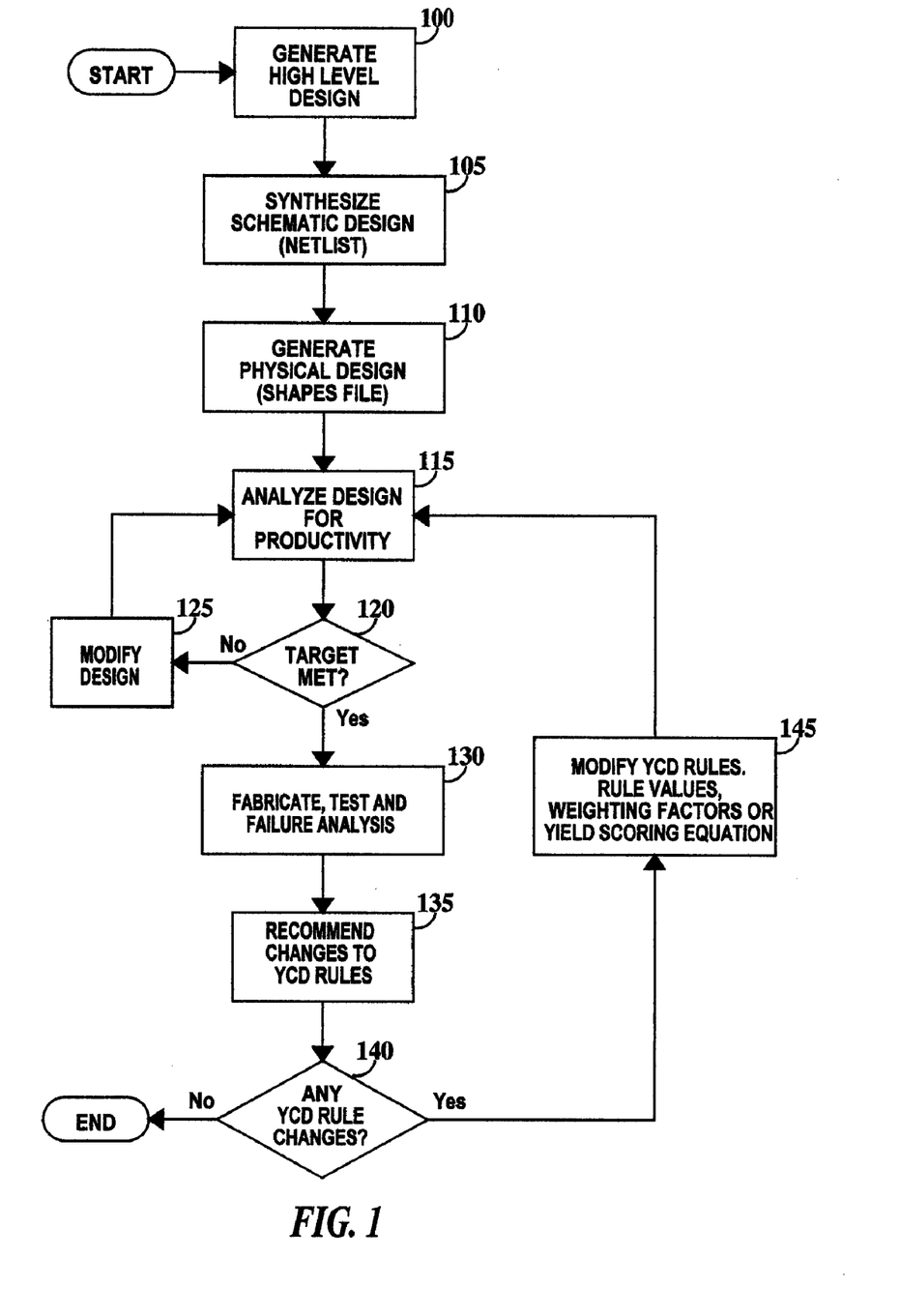
FIG. 1 is a flowchart illustrating the method of generating and rule checking an integrated circuit design according to the present invention.

FIG. 1 is a flowchart illustrating the method of generating and rule checking an integrated circuit design according to the present invention. In step 100, a high-level integrated circuit design is generated. In step 105 the high-level integrated circuit design generated in step 100 is converted into a schematic integrated circuit design (also known as a Netlist) by a synthesis program using circuit elements from a synthesis library. Other activities that may occur in step 105 include, but are not limited to, noise modeling and simulation and timing analysis. Several loops of noise modeling, simulation and timing analysis as well as adjustment to the schematic integrated circuit design (i.e. changing elements, wiring runs, power distribution etc,) may be performed until the designer is satisfied with the performance of the integrated circuit. In step 110, physical design is performed, in order to generate a Shapes File of the actual shapes that will be used to fabricate the mask set that will be used in the fabrication of the integrated circuit. The Shapes File includes a Prime Cell, which may further include sub-Cells (hereafter Cells). The Prime Cell can be an entire integrated circuit chip or a portion thereof.

In step 115, the Shapes File is analyzed for manufacturing productivity. This entails generating a yield checking deck (YCD) having Yield Limiting Rules, Design Efficiency Rules and Weighting Factors (WF) for each rule, running the YCD against the Shapes File generated in step 110 in order to generate a YCD Output File, performing rule scoring calculations on the YCD Output File using Rule Scoring Equations and presenting a summary report. The YCD uses the industry standard format of design rule checking (DRC), such as found in software programs available from Cadence Corporation, San Jose, Calif. or Synopsys Inc., Mountainview, CaA. Both Design Efficiency Rules and Yield Limiting Rules are included because manufacturing productivity of an integrated circuit is a function of both the area usage of an integrated circuit (or chip) as well as the manufacturing yield. A special software program analyzes the YCD Output File, and generates a YCD Summary Report, which is a report that may be displayed or printed. Step 115 is described in detail infra in reference to FIG. 2.

In step 120, the YCD Summary File is examined by the designer and it is determined if the integrated circuit design meets predetermined manufacturing productivity targets. If the integrated circuit design does not meet the predetermined manufacturing productivity targets the method proceeds to step 125, otherwise the method proceeds to step 130. In step 125, based on a summary and/or detailed section of the YCD Summary File, the designer can make adjustments to the individual cells or shapes within a cell of the Shapes File. Then the method loops back to step 115.

Returning to step 130, in step 130, the integrated circuit is fabricated, tested and/or failure analysis performed. In step 135, based on the test and/or failure analysis performed in step 130, changes to the Design Efficiency Rules, Yield Limiting Rules, Weighting Factors or Rule Scoring Equations used to generate the YCD Summary Report in order to better match actual results may be proposed. Next in step 140, it is determined if any YCD rules, weighting factors or yield score equations are to be changed. If in step 140, no YCD rules or are to be changed, then the method ends, otherwise the method proceeds to step 145. In step 145, the designer may modify the Design Efficiency Rules, Yield Limiting Rules, Weighting Factors or Rule Scoring Equations for use the next time step 115 is performed. In this manner, the predictive value of the method is constantly improved.

Figure 2:
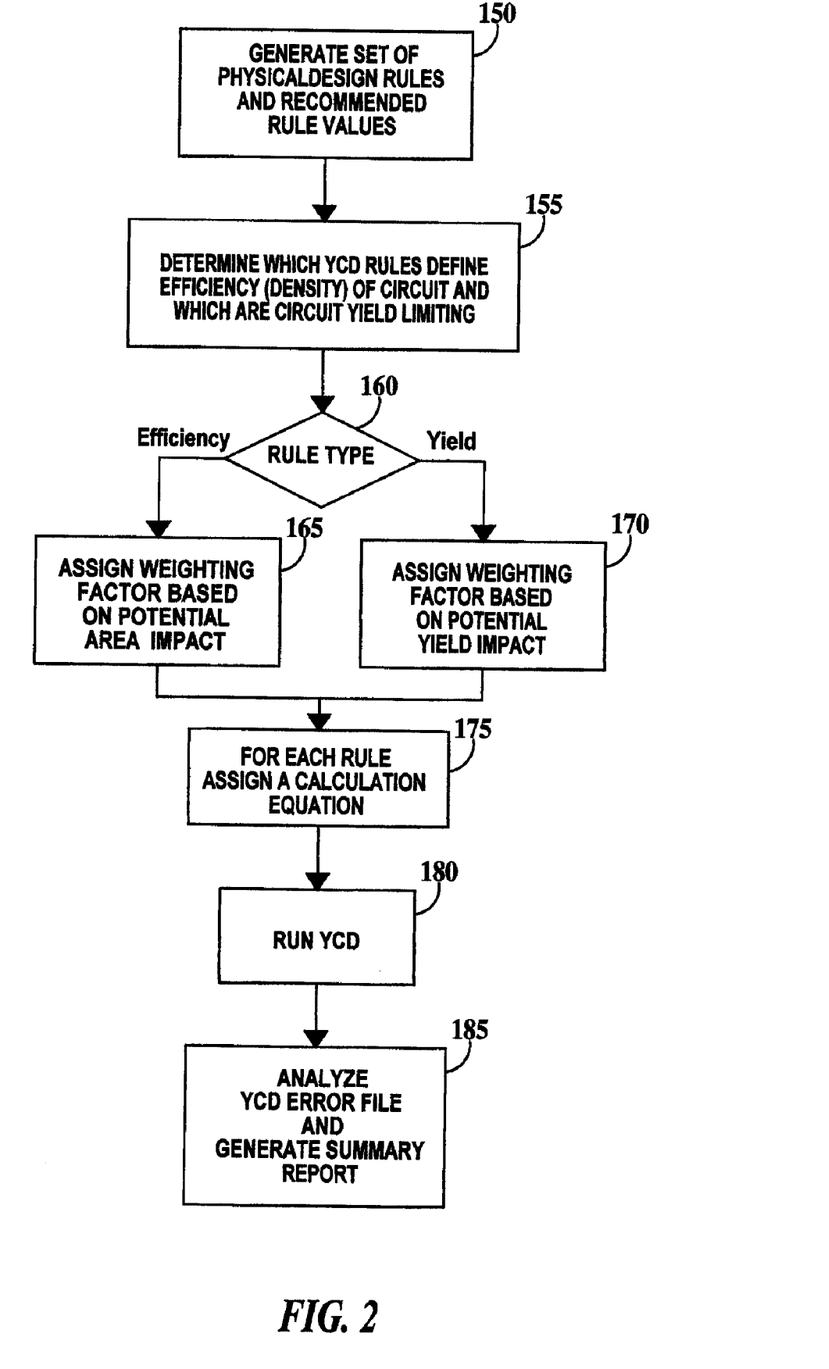
FIG. 2 is a flowchart illustrating step 115 of FIG. 1.

FIG. 2 is a flowchart illustrating step 115 of FIG. 1. In step 150, physical design rules are generated along with the recommended value (RV) for each rule. In step 155 it is determined which physical design rules are Design Efficiency Rules and which are Yield Limiting Rules. Examples of Design Efficiency Rules, Yield Limiting Rules and their RVs may be found in the Rule Definition and Rule Value columns of exemplary TABLE I infra.

Design Efficiency Rules address the chip size aspect of manufacturing productivity, the smaller the chip the more chips per wafer, the higher the manufacturing productivity. Yield Limiting Rules address the problem of minimum groundrules, which if followed for the advanced and smaller groundrule designs (for example 130 nm or 90 nm) can result in chip loss and reduced manufacturing productivity by replacing at least some of the minimum groundrules with recommended rules and/or by using Weighting Factors and Rule Scoring Equations to push the designer away from using minimum groundrules in particular cells. Thus, Yield Limiting Rules tend to increase chip size and lower manufacturing productivity. This tradeoff is addressed by the present invention.

Examples of Design Efficiency Rules are rules R1 through R5 of TABLE I. These rules define (1) the area that is recommended for silicon area (the area of the silicon used for the source/drains and body of a field effect transistor (FET) transistor) as well as defining the area for shallow trench isolation, often called the RX mask level and (2) the gate area of an FET or sub-collector area of a bipolar transistor, often called the PC masking level and FET and bipolar transistor are examples of active devices. Diodes are another example of an active device. In general, design efficiency rules may include rules for silicon area usage for active devices such as FETs and the gates of FETs, bipolar transistors and diodes and passive elements such as resistors, inductors, capacitors and fuses. Note each of these rules has a Weighting Factor. Weighting Factors are described infra. Examples of Yield Limiting Rules are rules R6 through R26 of TABLE I and are similar to conventional yield limiting rules except weighting factors have been included for each rule.

If in step 160, the rule type is design efficiency then in step 165 that rule is assigned a WF between the lowest and highest possible value depending on the potential impact of deviation from the rule on area related productivity. If in step 160, the rule type is yield limiting, then in step 170 the rule is assigned a WF between the lowest and highest possible value depending on the potential impact of deviation from the rule on yield related productivity. In the present example, a WF of 1 is assigned to those rules with the most impact on area productivity or yield and a WF of 5 to those rules with the least impact on productivity. Current experience suggests a WF of 1 (or a least a very low value) should be assigned to Yield Limiting Rules though this may vary by integrated circuit type and manufacturing facility. It should be noted that individual Yield Limiting Rules, WFs, and Rule Scoring Equations may also vary by integrated circuit type and manufacturing facility or even tool and tool types within a manufacturing facility. Next in step 175, the Rule Scoring Equation is defined for each physical design rule. In the Rule Scoring Equation of TABLE I, the measured rule value of the shape or shapes used in the integrated circuit design is designated the error value (EV) and the recommended value (or rule value) for the rule is designated RV. The actual value is designated EV because only actual values violating the RV appear in the YCD Output File.

TABLE I

EXEMPLARY YCD RULES

| Rule | YCD RULE DEFINITIONS | RULE VALUE | WF | RULE SCORING EQUATION |
|---|---|---|---|---|
| | DESIGN EFFICIENCY RULES | $\mu$ | | |
| R1 | Outline Area | $=10^6$ | 1 | |
| R2 | Silicon Area/Outline Area | >=0.70 | 1 | $(EV/RV)^2$ |
| R3 | Silicon Area/Outline Area | <=0.70 | 1 | $(RV/EV)^2$ |
| R4 | Gate Area/Silicon Area | >=0.15 | 1 | $(EV/RV)^2$ |
| R5 | Gate Area/Silicon Area | <=0.20 | 1 | $(RV/EV)^2$ |
| | YIELD LIMITING RULES<br>Model Accuracy/Circuit Limited Yield | ($\mu$ or $\mu^2$) | | |
| R6 | Silicon Min Width | >=0.24 | 1 | $e - [(EV - RV)^2/WF]$ |
| R7 | Silicon Min Area | >=0.14 | 2 | $e - [(EV - RV)^2/WF]$ |
| R8 | Min Gate Overlap Silicon Area | >=0.23 | 5 | $e - [(EV - RV)^2/WF]$ |
| R9 | Gate To Silicon Corner Min Distance | >=0.12 | 4 | $e - [(EV - RV)^2/WF]$ |
| R10 | Gate Area Max | <45.00 | 4 | $e - [((EV - RV)/EV)^2/WF]$ |
| R11 | Metal Area/(Gate + 2*S/D) | <=100 | 5 | $e - [((EV - RV)/EV)^2/WF$ |
| R12 | Via Area/(Gate + 5*S/D Area) | <=7.00 | 5 | $e - [((EV - RV)/EV)^2/WF]$ |
| | Required Rules | | | |
| R13 | Max Gate Length | <=0.60 | 5 | $e - [((EV - RV)/EV)^2/WF]$ |
| R14 | Gate Width Max Case 1 | <=5.00 | 5 | $e - [((EV - RV)EV)^2/WF]$ |
| R15 | Gate Width Max Case 2 | <=1.20 | 5 | $e - [((EV - RV)EV)^2/WF]$ |
| R16 | Gate Width Max Case 3 | <=10.00 | 5 | $e - [((EV - RV)EV)^2/WF]$ |
| R17 | Gate Width Max Case 4 | <=20.00 | 5 | $e - [((EV - RV)EV)^2/WF]$ |
| R18 | Gate Width Max Case 5 | <=5.00 | 5 | $e - [((EV - RV)EV)^2/WF]$ |
| R19 | Trench Width For Length >2.0 | >=0.26 | 1 | $e - [(EV - RV)^2/WF]$ |

TABLE I-continued

EXEMPLARY YCD RULES

| Rule | YCD RULE DEFINITIONS | RULE VALUE | WF | RULE SCORING EQUATION |
|---|---|---|---|---|
| R20 | (Contact over Silicon) to Gate Space Resistive Via Rules | >=0.14 | 5 | $e - [(EV - RV)^2/WF]$ |
| R21 | Contact Area S/D to Metal | >=0.025 | 2 | $e - [(EV - RV)^2/WF]$ |
| R22 | Contact Area Gate to Metal | >=0.025 | 3 | $e - [(EV - RV)^2/WF]$ |
| R23 | R23: Contact Area Gate to Silicon Contact Density Rules | >=0.025 | 3 | $e - [(EV - RV)^2/WF]$ |
| R24 | Contact Area/Diffusion Area | >=0.05 | 2 | $e - [(EV - RV)^2/WF]$ |
| R25 | Contact Area/Diffusion Area (Gate) | <=0.10 | 1 | $e - [((EV - RV)/EV)^2/WF]$ |
| R26 | R27: Contact Area/Gate Area | >=0.04 | 3 | $e - [(EV - RV)^2/WF]$ |

In step 180, the YCD is run and the YCD Output File generated. The YCD Output File comprises two files. The first file is an Error File having two sections. The first section is for the Design Efficiency Rules for the Prime Cell and contains records listing the Outline Area Rule for the Prime Cell and its value, the Gate Area divided by Outline Area Rule RV and EV and the Gate Area divided by the Silicon Area Rule RV and EV. The second section is for the Yield Limiting Rules for the Prime Cell and any Cells and contains a Rule Record for every Yield Limiting Rule that has been violated by any cell within the circuit design, a WF for the Rule, a Cell sub-record for every Cell violating the Rule, and the EV of the violation. The second file is a Tree File, listing the number of Flat Placement Counts for each Cell listed for each Rule. This takes into account that there is a violation each time a Cell having a violation is used in the design. An exemplary YCD Output File is illustrated in TABLE II. It is possible to use a flat error file, eliminating the need for the Tree File, but then the Error File may become very large.

TABLE II

EXEMPLARY YCD OUTPUT FILE

ERROR FILE

| RULE | RV | WF | CELL | EV $\mu$ or $\mu^2$ | TREE FILE CELL COUNT |
|---|---|---|---|---|---|
| Efficiency Rules | | | | | |
| R1 | 18430 | 1 | PRIME | | |
| R2 & R3 | | 1 | PRIME | 0.3781 | |
| R4 & R5 | | 1 | PRIME | 0.2315 | |
| Yield Rules | | | | | |
| R6 | >=0.24 | 1 | C1 | 0.1 | 3 |
| | | | C2 | 0.2 | 3 |
| | | | ↓ | | |
| | | | CX1 | 0.2 | 7 |
| R7 | >=0.14 | 2 | C1 | 0.2 | 4 |
| | | | C4 | 0.3 | 3 |
| | | | ↓ | 0.4 | |

TABLE II-continued

EXEMPLARY YCD OUTPUT FILE

ERROR FILE

| RULE | RV | WF | CELL | EV $\mu$ or $\mu^2$ | TREE FILE CELL COUNT |
|---|---|---|---|---|---|
| | | | CX2 | 0.2 | 7 |
| ↓ | | | | | |
| R26 | <=0.04 | 3 | C3 | 0.4 | 6 |
| | | | C4 | 0.2 | 8 |
| | | | ↓ | | |
| | | | CX3 | 0.2 | 3 |

As note supra, the YCD Output File is a DRC having specially adapted rules and uses DCRCormat and runs on DCRsCoftware, the operation of which is well known by anyone of ordinary skill in the art. Each record in the YCD Output File indicates the rule violated, the EV for the particular violation instance, the RV for the rule and the WF for the rule. In step 185, a special software program analyzes the YCD Output File and generates the YCD Summary Report. Step 185 is described infra in reference to FIG. 3 and an exemplary YCD Summary Report is illustrated in TABLE III infra.

Figure 3:
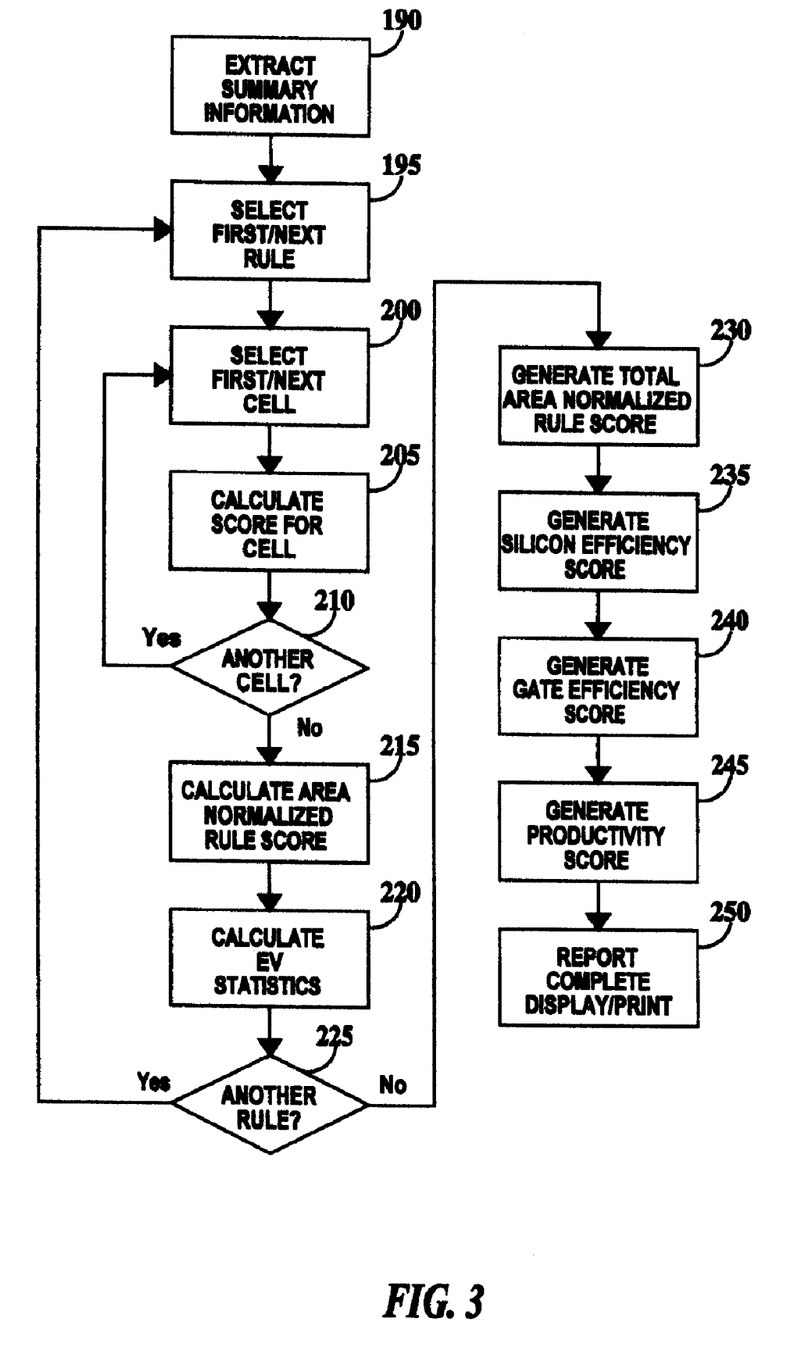
FIG. 3 is a flowchart illustrating step 185 of FIG. 2.

FIG. 3 is a flowchart illustrating step 185 of FIG. 2. A specially written software program performs steps 195 through 250. In one example, a Practical Extraction and Report Language (PERL) program is used, but any programming language may be used. The program accesses a data file cross-referencing each Design Efficiency Rule and Yield Limiting Rule to its corresponding Rule Scoring Equation. The other data the program operates on is data in the YCD Output File. The program generates the YCD Summary Report, which is displayed by a graphical unit interface (GUI) as (or after) the extractions and calculations performed on the YCD Output File are completed. An exemplary YCD Output File is illustrated in TABLE III.

TABLE III

EXEMPLARY YCD SUMMARY REPORT

SUMMARY SECTION

| | |
|---|---|
| Prime Cell Area | 18430.2720$\mu^2$ |
| Area Normalized Score | 0.78235 per mm$^2$ |
| Silicon Area RV | R1 & R2 = 0.70$\mu^2$ |

TABLE III-continued

EXEMPLARY YCD SUMMARY REPORT

| | |
|---|---|
| Silicon Area EV | $0.3781\mu^2$ |
| Silicon Area Efficiency | 0.29175 |
| Gate Area RV | $0.15\mu^2 <= R3 \& R4 >= 0.20\mu^2$ |
| Gate Area EV | $0.2315\mu^2$ |
| Gate Area Efficiency | 0.74638 |
| Productivity Score | 0.17036 |

DETAIL SECTION

| Area Normalized Rule Score | Unique EV Count | Total EV Count (Tree File) | EV Count Per Unit Area | EV High ($\mu$ or $\mu^2$) | EV Low ($\mu$ or $\mu^2$) | WF | Rule |
|---|---|---|---|---|---|---|---|
| 0.81153 | 146 | 178 | 9658 | 0.1131 | 0.1500 | 1 | R25 |
| 0.97683 | 6 | 6 | 326 | 2.0000 | 2.0000 | 5 | R15 |
| 0.99607 | 9 | 12 | 651 | 4.2200 | 5.5200 | 5 | R14 |
| 0.99703 | 578 | 686 | 37221 | 0.0800 | 0.0800 | 5 | R20 |
| 0.99794 | 3 | 3 | 163 | 4.7500 | 6.4000 | 5 | R18 |
| 0.99815 | 114 | 124 | 6728 | 0.0022 | 0.0377 | 3 | R26 |
| 0.99859 | 1 | 1 | 54 | 25.0000 | 25.0000 | 5 | R17 |
| 0.99935 | 3 | 3 | 163 | 0.0096 | 0.0120 | 1 | R23 |
| 0.99987 | 6 | 6 | 326 | 0.0800 | 0.0800 | 4 | R9 |
| 0.99990 | 20- | 23 | 1248 | 0.1800 | 0.1800 | 5 | R8 |
| 0.99994 | 8 | 12 | 651 | 0.0162 | 0.0483 | 2 | R24 |
| 0.78235 | 894 | 1054 | 57189 | <=== Column Totals | | | |

Note:
Total Area Normalized Score is the product of all scores

Reference to TABLE III should be made during the discussion of steps 190 through 250.

In step 190, the Rule, the WF, the EV Low and EV High for each Rule are extracted directly from the YCD Output File for display in the corresponding fields of the Detail Section of the Summary Report and Prime Cell Area, Silicon Area RV, Silicon Area EV, Gate Area RV and Gate Area EV are extracted directly from the YCD Output File for display in the corresponding fields of the Summary Section of the YCD Summary Report.

In step, 195 the first or next Rule Record is selected from the YCD Output File. In step 200, the first or next Cell sub-record within the Rule Record is selected (both the error file portion and the corresponding tree file portion) from the YCD Output File. In step 205, a Cell Score for the selected cell is calculated using the corresponding Rule Scoring Equation (See TABLE I) for the selected Rule. In step 210 it is determined if there are other Cell sub-records for the current Rule Record. If in step 210, it is determined there are other Cell sub-records for the current Rule Record, the method loops back to step 200 where the next Cell sub-record of the current Rule Record is selected, otherwise the method proceeds to step 215.

In step 215, all the individual Cell Scores for each Cell sub-record of the current Rule Record are multiplied together and the prime cell is normalized to 1 mm² to give a Rule Score for the current Rule. In step 220, four EV statistics for the current Rule are calculated. First, the Unique EV Count is calculated by counting the number of Cell records in the current Rule record. Second, the Total EV Count is calculated by summing all the Cell Counts in the Tree File corresponding to the Cell records of the current Rule record. Third, the EV Count Per Unit Area is calculated by multiplying the Total EV Count by $10^6$ and dividing the result by the Prime Cell Area. Fourth, the highest EV and lowest EV of all Cells records in the current Rule record are determined. Unique EV Count, Total EV Count and EV Count Per Unit Area column totals are generated after the last Rule loop.

In step 225 it is determined if there are additional Rule Record requiring processing exist. If in step 225, it is determined there are other Rule Records, the method loops back to step 195 where the next Rule Record is selected, otherwise the method proceeds to step 230.

In step 230, the Total Area Normalized Rule Score is calculated by multiplying the individual Rule Scores together. The Total Area Normalized Rule Score is a measure of circuit yield. Maximum manufacturing productivity is obtained with a Total Area Normalized Rule Score of 1.0000.

In step 235, the Silicon Area Efficiency is calculated using the Silicon Area RV, Silicon Area EV in the Silicon Area/ Outline Area Rule (See TABLE I, R2 and R3 entries) Rule Evaluation Equation. In the present example, since EV<RV the R3 equation is used and evaluates as $(0.3781/0.70)^2 = 0.29175$. Maximum Silicon Area Efficiency is obtained with a Silicon Area Efficiency=1.0000.

In step 240, the Gate Area Efficiency is calculated using the Gate Area RV, Gate Area EV in the Gate Area/Silicon Area Rule (See TABLE I, R42 and R4 entries) Rule Evaluation Equation. In the present example, since EV>0.20 the R5 equation is used and evaluates as $(0.201/0.2315)^2 = 0.74638$. If the Gate Area EV had been less than 0.15 the R4 Rule Evaluation Equation would have been used. If the Gate Area EV had been less between 0.15 and 0.20 then no Rule Evaluation Equation would have been used and a default value of 1.0000 would be used for Gate Area Efficiency. Maximum Gate Efficiency is obtained with a Gate Efficiency=1.0000.

In step 245, the Productivity Score is calculated by multiplying the Area Normalized Score, the Silicon Efficiency and the Gate Efficiency together. In the present example the Area Productivity evaluates as (0.78235)×

(0.29175)×(0.74638)=0.17036. Maximum manufacturing productivity is obtained with a Productivity Score=1.0000.

In step 250, the YCD Summary Report is complete and is displayed and/or printed.

Figure 4A:
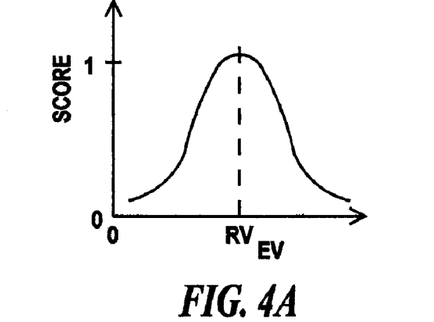
FIGS. 4A, 4B, 4C and 4D are plots of design value versus manufacturing productivity score for exemplary scoring functions according to the present invention.
Figure 4B:
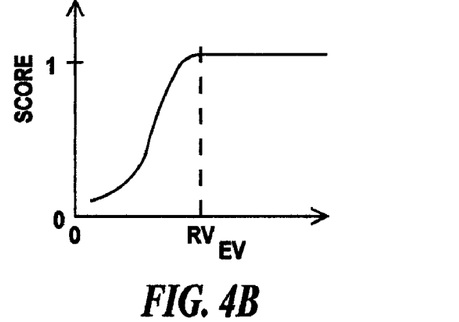
Figure 4C:
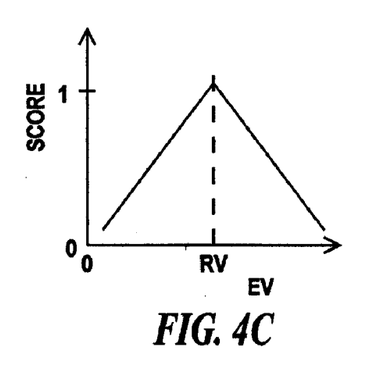
Figure 4D:
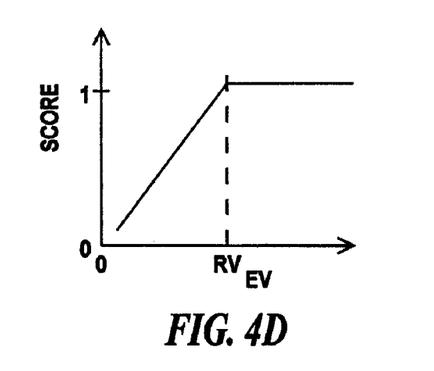

FIGS. 4A, 4B, 4C and 4D are plots of design value versus Productivity Score for exemplary scoring functions according to the present invention. It should be noted in TABLE I, that Design Efficiency Rules utilized Rule Scoring Equations that are straight power functions of EV and RV (essentially parabolic functions), while Yield Limited Rules utilized Rule Scoring Equations that are Gaussain functions of EV and RV. Virtually any equation may be used that will model actual manufacturing productivity results when the integrated circuit design is fabricated. The Rule Scoring Equations of TABLE I were selected as being good models of actual manufacturing productivity results. FIG. 4A is a Gaussain Rule Scoring Equation. Note EV is plotted against Score (which is the evaluation of the equation), that the score is limited to a number between zero and one inclusively and that the maxima of the Gaussain distribution occurs at RV. FIG. 4B is a modified Gaussain that returns a score of one for any EV greater to or greater than RV. FIG. 4C utilizes a sawtooth function of RV and EV, while FIG. 4D utilizes a linear function that returns a score of one for any EV greater to or greater than RV. Thus, by judicious selection of the Rule Scoring Equation that best models the real world the potential of the present invention to maximize manufacturing productivity can be realized.

Figure 5:
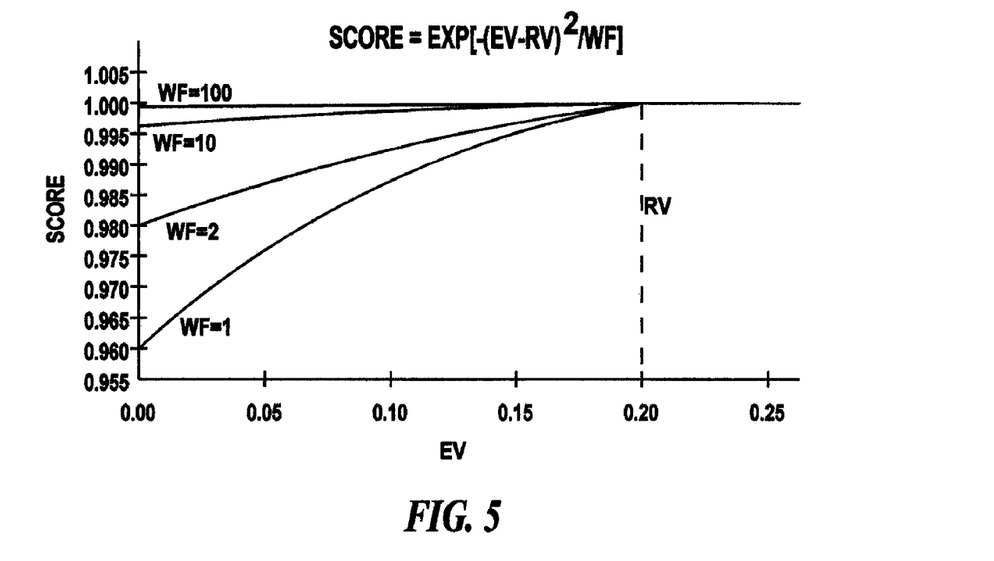
FIG. 5 is an exemplary detailed Gaussain scoring function illustrating the impact of weighting on scoring according to the present invention.

FIG. 5 is an exemplary detailed Gaussain scoring function illustrating the impact of weighting on scoring according to the present invention. The use of Weighting Factors is a method of easily tuning the accuracy of the Rule Scoring Equation once it is selected. In FIG. 5, equation (1):

$$\text{Score} = e^{-[(EV-RV)/WF]} \qquad (1)$$

where the score is plotted as a function of EV for various values of WF when RV=0.20. When WF is set to 1 (maximum effect) the score fails off relatively sharply as EV decreases compared to when the WF is set to 2 or 10. At a WF of about 100, there is very little effect on score as EV changes. Thus, weighting factor value selection should be based on the importance of any particular Design Efficiency Rule or Yield Limiting Rule on manufacturing productivity to properly model its impact on manufacturing productivity.

It is possible, especially when working with very course design grids, to replace Rule Scoring Equations with lookup tables based on Rule Scoring Equations in order to reduce computing time.

Figure 6:
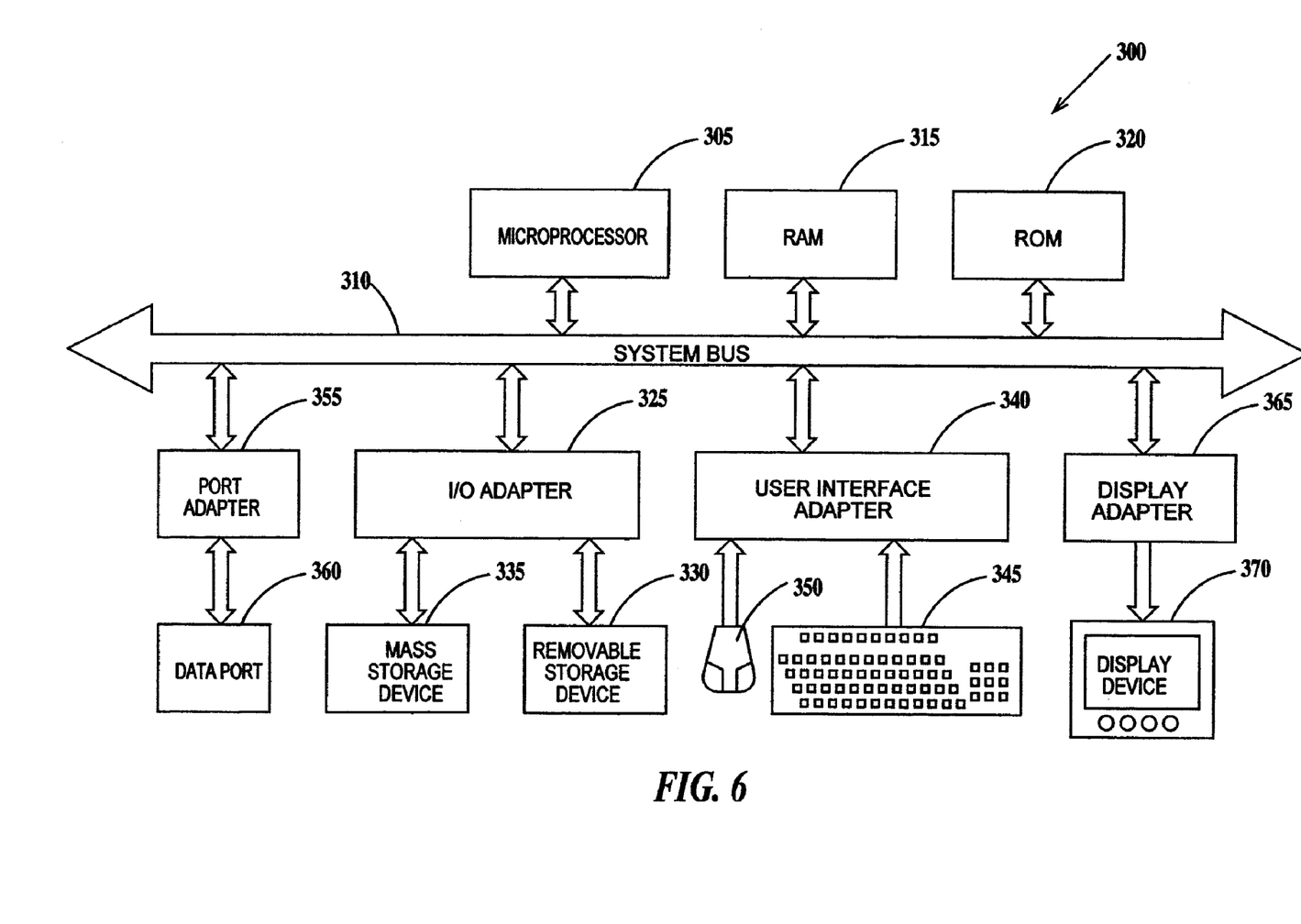
FIG. 6 is a schematic block diagram of a general-purpose computer for practicing the present invention.

Generally, the method described herein with respect to generating and rule checking an integrated circuit design is practiced with a general-purpose computer and the method may be coded as a set of instructions on removable or hard media for use by the general-purpose computer. FIG. 6 is a schematic block diagram of a general-purpose computer for practicing the present invention. In FIG. 6, computer system 300 has at least one microprocessor or central processing unit (CPU) 305. CPU 305 is interconnected via a system bus 310 to a random access memory (RAM) 315, a read-only memory (ROM) 320, an input/output (I/O) adapter 325 for a connecting a removable data and/or program storage device 330 and a mass data and/or program storage device 335, a user interface adapter 340 for connecting a keyboard 345 and a mouse 350, a port adapter 355 for connecting a data port 360 and a display adapter 365 for connecting a display device 370.

ROM 320 contains the basic operating system for computer system 300. The operating system may alternatively reside in RAM 315 or elsewhere as is known in the art. Examples of removable data and/or program storage device 330 include magnetic media such as floppy drives and tape drives and optical media such as CD ROM drives. Examples of mass data and/or program storage device 335 include hard disk drives and non-volatile memory such as flash memory. In addition to keyboard 345 and mouse 350, other user input devices such as trackballs, writing tablets, pressure pads, microphones, light pens and position-sensing screen displays may be connected to user interface 340. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 330, fed through data port 360 or typed in using keyboard 345.

Thus, the present invention provides the semiconductor industry with a method of improving integrated circuit manufacturing productivity utilizing efficient rule checking.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

The invention claimed is:

1. A method of improving manufacturing productivity of an integrated circuit, comprising:
    (a) generating a set of physical design rules,
    (b) assigning a rule scoring equation to each physical design rule of said set of physical design rules;
    (c) checking a physical design of said integrated circuit for deviations from each design rule;
    (d) computing a score for each physical design rule, using the corresponding rule scoring equation assigned to each physical design rule, for which one or more deviations were found in step (c); and
    (e) computing a productivity score for said integrated circuit design based on said scores computed in step (d).

2. The method of claim 1, step (b) further including:
    assigning weighting factors to some or all of said physical design rules, said weighting factor incorporated into the corresponding rule scoring equations.

3. The method of claim 1, wherein said set of physical design rules further comprises a set of design efficiency rules and a set of yield limiting rules.

4. The method of claim 3, wherein said design efficiency rules are rules for the area of an integrated circuit chip utilized by particular mask levels of said physical design.

5. The method of claim 4, wherein said particular mask levels include those areas used for active devices such as field effects transistors, the gates of field effect transistors, bipolar transistors and diodes and passive elements such as resistors, inductors, capacitors and fuses.

6. The method of claim 3, wherein step (d) includes:
computing a score for each design efficiency rule, using a corresponding rule scoring equation assigned to each design efficiency rule;
computing a score for each yield limiting rule, using a corresponding rule scoring equation assigned to each yield limiting rule, for which one or more deviations were found in step (c); and
wherein said productivity score is a based on said score for each design efficiency rule and based on an integrated circuit design area normalized function of scores for each yield limiting rule for which one or more deviations were found in step (c).

7. The method of claim 1, further including between steps (c) and (d):
providing a list of all design rule violations for which one or more deviations were found in step (c).

8. The method of claim 7, wherein said set of physical design rules are in Design Rule Checking format and said list of all design rules is generated using Design Rule Checking software.

9. The method of claim 1, wherein each said rule scoring equation is a linear, power or Gaussain function of a recommended value and an actual design value used in the physical design.

10. The method of claim 1, further including:
(f) modifying said physical design of said integrated circuit based on said score for each physical design rule, said productivity score or both said score for each physical design rule and said productivity score.

11. A computer system comprising a processor, an address/data bus coupled to said processor, and a computer-readable memory unit coupled to said processor, said memory unit containing instructions that when executed by said processor implement a method for improving manufacturing productivity of an integrated circuit, said method comprising the computer implemented steps of:
(a) generating a set of physical design rules,
(b) assigning a rule scoring equation to each physical design rule of said set of physical design rules;
(c) checking a physical design of said integrated circuit for deviations from each design rule;
(d) computing a score for each physical design rule, using the corresponding rule scoring equation assigned to each physical design rule, for which one or more deviations were found in step (c); and
(e) computing a productivity score for said integrated circuit design based scores computed in step (d).

12. The system of claim 11, step (b) further including:
assigning weighting factors to some or all of said physical design rules, said weighting factor incorporated into the corresponding rule scoring equations.

13. The system of claim 11, wherein said set of physical design rules further comprises a set of design efficiency rules and a set of yield limiting rules.

14. The system of claim 13, wherein said design efficiency rules are rules for the area of an integrated circuit chip utilized by particular mask levels of said physical design.

15. The system of claim 14, wherein said particular mask levels include those areas used for active devices such as field effects transistors, the gates of field effect transistors, bipolar transistors and diodes and passive elements such as resistors, inductors, capacitors and fuses.

16. The system of claim 13, wherein step (d) includes:
computing a score for each design efficiency rule, using a corresponding rule scoring equation assigned to each design efficiency rule;
computing a score for each yield limiting rule, using a corresponding rule scoring equation assigned to each yield limiting rule, for which one or more deviations were found in step (c); and
wherein said productivity score is a based on said score for each design efficiency rule and based on an integrated circuit design area normalized function of scores for each yield limiting rule for which one or more deviations were found in step (c).

17. The system of claim 11, further including between steps (c) and (d):
providing a list of all design rule violations for which one or more deviations were found in step (c).

18. The system of claim 17, wherein said set of physical design rules are in Design Rule Checking format and said list of all design rules is generated using Design Rule Checking software.

19. The system of claim 11, wherein each said rule scoring equation is a linear, power or Gaussain function of a recommended value and an actual design value used in the physical design.

20. The system of claim 11, further including:
(f) modifying said physical design of said integrated circuit based on said score for each physical design rule, said productivity score or both said score for each physical design rule and said productivity score.

* * * * *

UNITED STATES PATENT AND TRADEMARK OFFICE
CERTIFICATE OF CORRECTION

PATENT NO. : 7,076,749 B2
APPLICATION NO. : 10/709807
DATED : July 11, 2006
INVENTOR(S) : Kemerer et al.

It is certified that error appears in the above-identified patent and that said Letters Patent is hereby corrected as shown below:

Column 1
Line 5, delete "BACKGROUND OF INVENTION"
Line 7, delete "1. Field of the Invention" and insert (centered and printed in capital letters) -- FIELD OF THE INVENTION --
Line 12, delete "2. Background of the Invention" and insert (centered and printed in capital letters) -- BACKGROUND OF THE INVENTION --

Column 2
Line 28, delete "etc," and insert -- etc. --
Line 46, delete "Calif." and insert -- Ca--
Line 47, delete "CaA" and insert --Ca --

Column 3
Line 6, delete "or"
Line 39, delete "(FET) transistor" and insert -- (FET) --

Column 4
In Table I, in the R11 entry, at the end of that line, insert -- ] --
In Table I, in the R13 through R18 entries, delete the "}" and insert -- / --

Columns 5 and 6
In Table II, delete the four arrows pointing down

Column 6
Line 33, delete "DRC" and insert -- DCR --
Line 34, delete "DCRCormat" and insert -- DCR format --
Line 35, delete "DCRsCoftware" and insert -- DCR software --
Line 39, begin a new paragraph after the period.

Column 7
Line 41, delete "In step, 95" and insert -- In step 195, --

Column 8
Line 67, delete "Productivity" and insert -- Normalized Score --

UNITED STATES PATENT AND TRADEMARK OFFICE
CERTIFICATE OF CORRECTION

PATENT NO. : 7,076,749 B2
APPLICATION NO. : 10/709807
DATED : July 11, 2006
INVENTOR(S) : Kemerer et al.

It is certified that error appears in the above-identified patent and that said Letters Patent is hereby corrected as shown below:

Column 9
Line 36, delete "Score=$_e{}^{-[(EV-RV)/WF]}$" and insert-- Score = $e^{-[(EV-RV)/WF]}$ --
Line 62, delete "a connecting" and insert --connecting --

Signed and Sealed this

Thirty-first Day of July, 2007

JON W. DUDAS
*Director of the United States Patent and Trademark Office*